United States Patent
Appaji

(10) Patent No.: US 8,731,610 B2
(45) Date of Patent: May 20, 2014

(54) METHOD FOR ADAPTIVE USER INTERFACE IN MOBILE DEVICES

(75) Inventor: Anuradha K. Appaji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1266 days.

(21) Appl. No.: 11/610,005

(22) Filed: Dec. 13, 2006

(65) Prior Publication Data

US 2008/0146245 A1    Jun. 19, 2008

(51) Int. Cl.
*H04M 1/72* (2006.01)
*H04W 16/22* (2009.01)
*H04W 4/02* (2009.01)
*H04W 4/18* (2009.01)
*H04M 1/725* (2006.01)
*G06F 3/0482* (2013.01)

(52) U.S. Cl.
CPC .............. *H04W 16/22* (2013.01); *H04W 4/18* (2013.01); *H04W 4/02* (2013.01); *H04M 1/72572* (2013.01); *G06F 3/0482* (2013.01)
USPC ...... 455/556.1; 370/401; 715/778; 455/456.1

(58) Field of Classification Search
CPC ......... H04W 16/22; H04W 4/18; H04W 4/02; H04M 1/72572; G06F 3/0482
USPC ........... 455/456.1, 557, 414.1; 701/400, 418, 701/500; 715/778, 764; 370/401; 340/539
See application file for complete search history.

(56) References Cited

U.S. PATENT DOCUMENTS

| | | | |
|---|---|---|---|
| 7,116,985 B2 | 10/2006 | Wilson et al. | |
| 2003/0125029 A1* | 7/2003 | Han | 455/444 |
| 2003/0184583 A1* | 10/2003 | Lim | 345/738 |
| 2004/0198389 A1* | 10/2004 | Alcock et al. | 455/456.1 |
| 2005/0054381 A1* | 3/2005 | Lee et al. | 455/557 |
| 2006/0165104 A1* | 7/2006 | Kaye | 370/401 |
| 2006/0270421 A1* | 11/2006 | Phillips et al. | 455/457 |
| 2007/0168127 A1* | 7/2007 | Zaruba et al. | 701/220 |
| 2007/0200674 A1* | 8/2007 | Moore et al. | 340/5.74 |
| 2008/0034314 A1* | 2/2008 | Louch et al. | 715/778 |

OTHER PUBLICATIONS

Wikipedia, Geofence, Wikipedia, 1 page.*
Eliezer Kantorowitz, et al.; "The Adaptable User Interface", ACM, Nov. 1989, vol. 32, No. 11, pp. 1352-1358.
Jeffrey Hightower, et al.; "A Survey and Taxonomy of Location Systems for Ubiquitous Computing", University of Washington-Computer Science and Engineering, Aug. 24, 2001, 24 pages.
Kimberle Koile, et al.; "Activity Zones for Context-Aware Computing", MIT Computer Science and Artificial Intelligence Laboratory, 2003, 18 pages.
Naizhi Li; "Supporting User Mobility with Web-based Mobile Computing", The University of British Columbia, Apr. 2001, 75 pages.
S. Jae Yang, et al.; "Web Browsing Performance of Wireless Thin-client Computing", Columbia University, 2003, 12 pages.

(Continued)

*Primary Examiner* — Mahendra Patel

(57) ABSTRACT

A system and method for providing a zone-based user interface (UI) on a mobile device are provided. The method includes defining usage zones and associating at least one user interface with each one of the defined usage zones. When the mobile device is within one of the defined usage zones, displaying the associated user interface.

20 Claims, 9 Drawing Sheets

(56) References Cited

OTHER PUBLICATIONS

Michael Hinz, et al.; "Context Modeling for Device- and Location-Aware Mobile Web Applications", Dresden University of Technology, Department of Computer Science, 2005, 4 page.
Pekka Iso-Ketola, et al.; "A Mobile Device as User Interface for Wearable Applications", Tampere University of Technology, 2005, 5 pages.
Amin Vahdat, et al.; "WebOS: Operating System Services for Wide Area Applications", University of Texas, Austin, Computer Science Department, 1998, 12 pages.
Rodrigo De Oliveira, et al.; "Towards an Approach for Multi-Device Interface Design", UNICAMP—Campinas State University, 2005, 3 pages.
Mark Weiser, et al.; "The Coming Age of Calm Technology", Xerox PARC, Oct. 5, 1996, 17 pages.

* cited by examiner

METHOD FOR ADAPTIVE USER INTERFACE IN MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

This disclosure relates to the field of wireless handheld electronic devices such as mobile telephones, personal digital assistants, handheld computers, and similar devices which are herein collectively referred to as handsets. More particularly, this disclosure relates to user interfaces on handsets that provide a user with the capability to access systems on the handset including desired applications.

User interfaces on wireless devices or handsets are difficult to use. The interfaces have many menu selections making it challenging for a user to manually navigate between the many different options. A user that requires immediate access to an option or application may find it difficult to figure out which buttons to push or which menus to select to access the desired option or application.

SUMMARY

According to one embodiment, a system and method for providing a zone-based user interface (UI) on a mobile device are provided. The method includes defining usage zones and associating at least one user interface with each one of the defined usage zones. When the mobile device is within one of the defined usage zones, displaying the associated user interface.

In accordance with another embodiment of the disclosure, a handset for customizing user interfaces is provided. The handset comprises a display, a processor, a memory, a first user interface related to a first geographic area and a second user interface related to a second geographic area. The processor is programmed to provide the first user interface to the display when the handset is in the first geographic area, and provide the second user interface to the display when the handset is in the second geographic area.

Further, in accordance with yet another embodiment of the disclosure, a system for adaptive user interface for a mobile device is provided. The system includes a storage device to store instructions that when processed by a processor promote defining usage zones, and associating at least one user interface with each one of the defined usage zones. Further when the mobile device is within one of the defined usage zones, displaying the corresponding user interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides a system that customizes the user interface (UI) display of a handset based on the location of the handset and/or the time. In one embodiment, the user may select a usage zone and have a particular user defined or selected UI display on the user's handset whenever the user is in that usage zone or area. User applications may be associated with the UI. For example, a UI for an office or business location may feature shortcuts to applications such as email and other business, office, or word-processing applications useful to the user at work. An office-related UI may also feature menu selections for business appointments, business reminders as well as readily accessible menu selections for other business-related activities.

The present disclosure also allows a user to define a UI for the user's home which may include menu selections for dinner favorites, family contacts, and family schedule. Other home-related UI handset features, functions, or applications may include shortcuts to access a home theater mode where a TV or stereo could be turned on or off. In such a scenario, VBA (Visual Basic for Applications) document technology, for example, and wireless and networking may converge and the handset would be operable as a remote to operate with home applications. As the user handset transitions from one usage zone to another, the UI displayed on the handset changes to the user defined UI related to the current location or zone. In yet another embodiment, the usage zone may be configured to be time-driven, so that, irrespective of the handset location, a user interface corresponding to a particular zone is activated for a particular user-determined time period.

Figure 1:
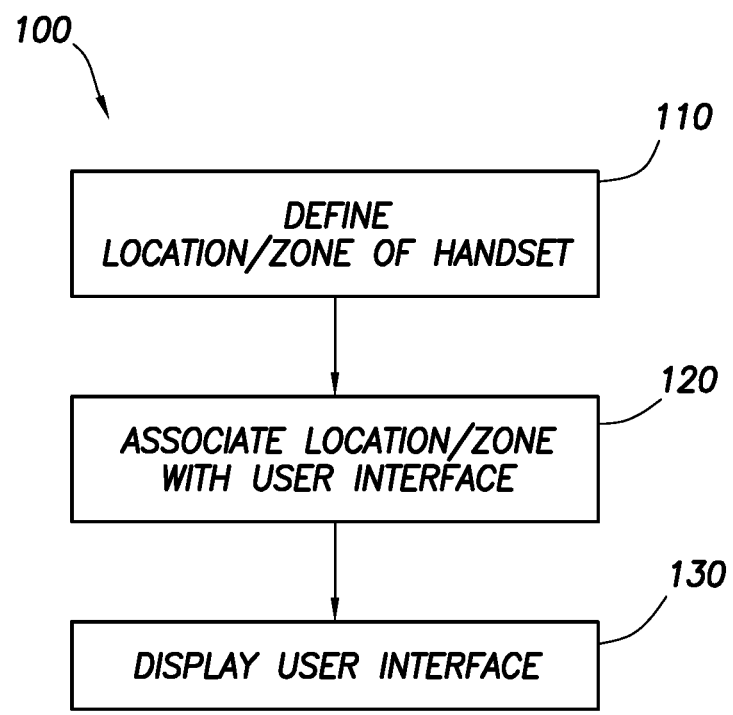
FIG. 1 is a flowchart of a method according to one embodiment of the present disclosure.

FIG. 1 depicts a flowchart that generally describes a method 100 according to one embodiment of the present disclosure. A usage location or zone of a handset is defined at block 110. These zones or locations, geographical, logical, or otherwise, may include, but are not limited to, a business or office zone, a home zone, a vacation zone, a commute zone and other zones as may be readily apparent to one of ordinary skill in the art. In some embodiments, the zone boundaries may be automatically defined by using a location based system, such as GPS, to set coordinates. For example, a user may define as a zone a location that is within a 10 mile radius from a current GPS-determined location. In other embodiments, the zone boundaries may be manually defined by using a map to figure out where a particular zone may be, and then entering the coordinates and the radius or the starting and ending coordinates for the zone. For example, the handset may include mapping software that enables the user to select or identify a zone or a location point and radius to define a zone or to select a starting point location, an ending point location, and everything in between the selected starting and ending point locations.

At block 120, the user associates a user-selected or defined UI with the zone and at block 130, the UI corresponding to the current zone is displayed on the handset when the user enters the zone.

Figure 2:
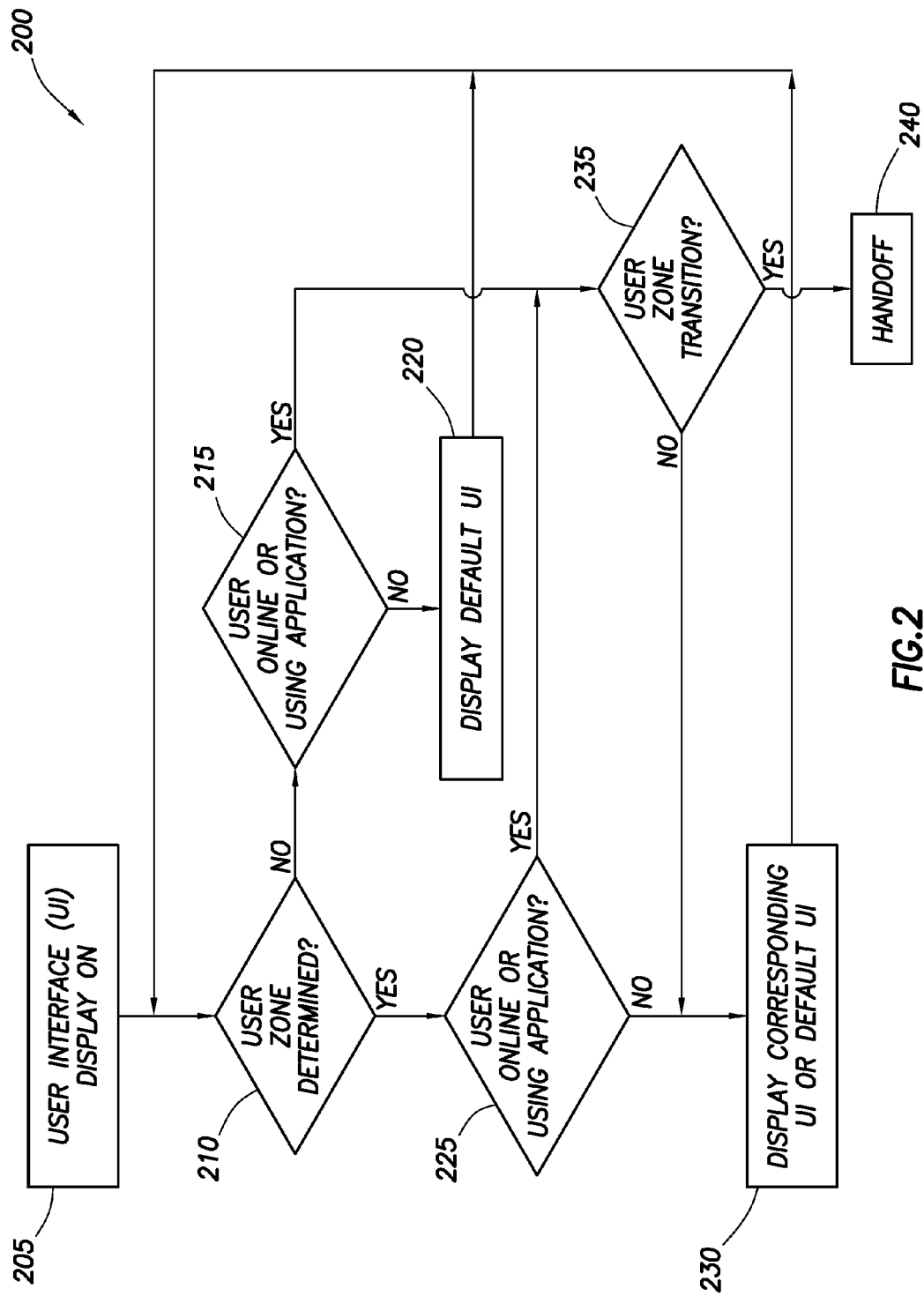
FIG. 2 is a flowchart describing an adaptive user interface method in accordance with another embodiment of the present disclosure.

FIG. 2 is a flowchart describing another embodiment of the present system. The method 200 begins when the handset is switched on, at block 205. The zone or geographic location of the handset may be determined at block 210 by using GPS, triangulation, or other well known techniques including, but not limited to satellite radar. If the zone cannot be determined, the method proceeds to block 215.

At block 215, the system determines whether or not the user is online, using applications, or otherwise using the handset. If the user is not online and/or is not using the handset, at block 220, a default UI may be displayed since the location or zone could not be determined. The default UI 220 may be selected or define by the user as the UI to be used when not within a user defined zone or when the location of the handset cannot be determined.

If the zone can be determined at block 210, the method proceeds to block 225, to determine whether the user is online, or currently using an application. If, at either blocks 215 or 225, the user is online or is using an application, then at block 235, the method considers whether the user is transitioning between zones. If the user is accessing an application as the user is transitioning between zones, then the UI may change before the user finishes with the application, thereby potentially disrupting the user.

Block 235 is checked to determine whether the user is transitioning between zones. If the user is transitioning then a transition routine is accessed at 240 to prevent a sudden change to the UI display on the handset and potential interruption of application processing on the handset while the user is active online or accessing an application. If there is no zone transition, then the handset UI will either display the UI corresponding to the current zone or a default UI display at block 230.

When the user is online or an application is active on the handset, a UI transition prompted by a change in zone or location may be delayed until such time as the change would not interrupt the user or application processing. For example, the UI might be updated when the user completes the current task or closes the application. Also in other embodiments, this delay feature may be used to override a zone change and continue with the current UI even though the handset has moved to a different zone with a different corresponding UI. For example, the user might make a one-time selection to have an office UI displayed while commuting or at home.

In some embodiments, however, the UI may be changed while the user is online or using an application without any disruption to the user. For example, where there is sufficient processing power on the handset and ample communication bandwidth, the only change that might be apparent to the user would be if changes were made to an application that the user was using or some other change was made that was noticeable on the display. Changes to the UIs might go unnoticed where the differences between the UIs are limited to changing the background, different shortcuts on the desktop area, rearranging menu item locations, and so on. Thus, when a user is using an application that consumes all or most of the display, such as email or spreadsheet applications, the user might not even be aware of a change to the UI that is beyond the view of the user. In instances where UI changes might impact the application or might otherwise affect the user experience, such as different color, sound, or other scheme changes, then such changes to the UI might be delayed as discussed above. Otherwise, the UI may be updated when the user moves to a new location or zone immediately or at a time that minimizes disruptions or interference to the user.

Any of these and other options for transition routines, such as automatically changing the UI when changing zones regardless of the user's activity, checking for user activity before changing the UI, or overriding a UI change may be implemented as user selectable options on the handset. For example an override flag or option may be provided that, if enabled, may prevent the handset UI display from changing as the user transitions from one zone to another. In other embodiments, other techniques may be used instead of a flag to determine when the user is active on the handset, and such techniques will readily suggest themselves to one skilled in the art.

In some embodiments, all or parts of the applications, UI, and other systems are stored on and executed by one or more processors on the handset. In other embodiments, the applications are remotely stored and executable by remote servers, such as in a WebOS or WebOS-type environment. In such embodiments, it may be necessary to hand-off execution of an application from one server to another during processing. For example, it may be helpful or necessary to coordinate application execution, along with application state information to promote a smooth transition, or hand off of execution of applications on servers serving different zones, and so on. Application execution coordination and hand-off may typically be separate from UI and associated usage zone changes. Additional information and examples on handing-off of applications is provided hereafter and may also be found in U.S. patent application Ser. No. 11/560,056 filed on Nov. 15, 2006 entitled, "Method for Handing Off Applications for WebOS-Enabled User Devices" (2006.07.023.WT0) (4133.6501) by Anuradha K. Appaji, which is incorporated herein by reference for all purposes. The present disclosure, however, should not be limited to embodiments involving WebOS-type applications.

Figure 3:
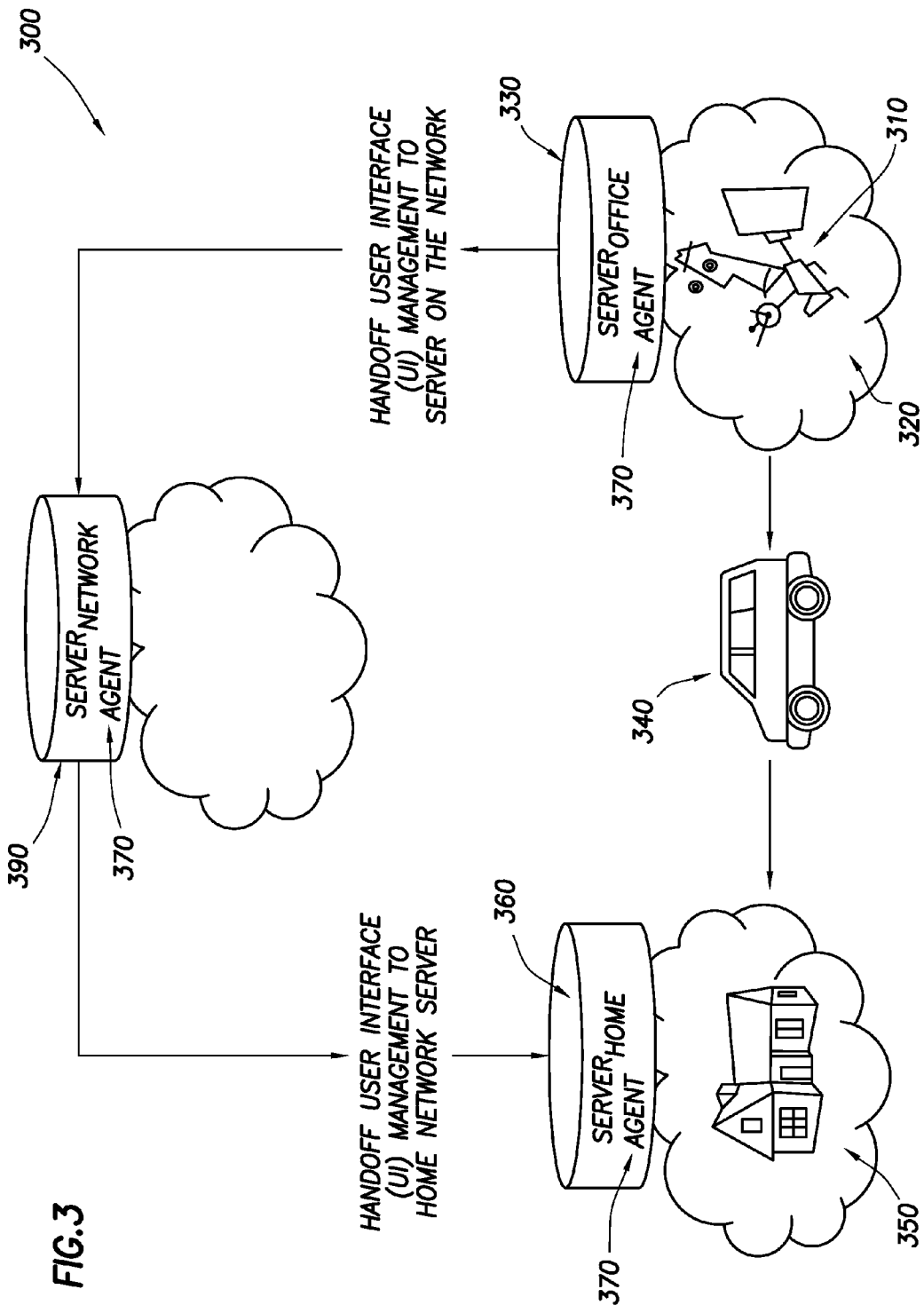
FIG. 3 illustrates an adaptive user interface system in accordance with one embodiment of the disclosure.

As illustrated in FIG. 3, some embodiments, such as WebOS, may use a plurality of network servers where all or some portion of the applications or systems for the handset are stored on and executed by processors on the servers. In this embodiment, the handsets can be very inexpensive since they only require minimal storage and processing capability. This architecture gives low-end devices capabilities commensurate with more robust systems, since the servers store and process the applications on behalf of the handset and only update the display of the handset. Consideration should be given to handing-off execution of applications, or other processes for operating the handset, such as responsibility for updating the UIs during a zone change. An agent 370 may be responsible for coordinating server hands off or passing control to another server, which may occur similar to cellular telephone call processing handoffs, or otherwise.

It should be appreciated that zones for UI purposes and areas serviced by network servers will typically be unrelated. For example, the geographical work or office zone defined by a user will likely have no relationship to the boundaries serviced by one of the network servers. However for purposes of simplicity and ease of description for this disclosure, the user defined usage and corresponding geographical zones for UI changes will be the same geographical areas serviced by a related network server in a WebOS-type environment. For example, in an office zone or location, the UI depicts the office zone display as defined by the user and provides access to office-related applications stored on a related server.

FIG. 3 depicts a system 300 for an adaptive UI enabled by a wireless network server environment. In this embodiment, a user 310 carries a handset from an office zone 320 to a commute zone 340 and from the commute zone 340 to a home zone 350. Typical examples of an office zone 320 may include, but are not limited to, a user's place of business or anywhere a user may conduct business. The commute zone 340 may be a highway or car or any such mode of travel or transportation or location that the user may so define. The home zone 350 may include a user's place of residence or hotel or any place or places that a user may define as the home zone 350. It is important to note that although system 300 illustrates three zones, the system is not limited to that number of zones. In fact, fewer or more zones may be defined and labeled in accordance with user needs and requirements.

While the user 310 is present in the office zone 320, the user 310 has access to an office-related UI displayed on the handset that promotes ready access to applications that are frequented or used by the user while at the office zone 320. For example, in the office zone 320, the user 310 may have access to email, and office or business-related applications that may be executed via a server 330 that performs processing relevant to those applications. In the commute zone 340, the user 310 may have access to weather and traffic shortcuts, and reminders that may be executed via a server 390. Further, in the home zone 350, the user 310 has access to home-related applications that may be executed via a server 360. The servers might also include a resident server handoff agent 370 that manages the transfer of control from one server to another and coordinates the user interface display transitions. The servers may include application software for configuring the resident server handoff agent 370. As previously mentioned, in other embodiments there would not be a one-to-one relationship between zones and servers as shown. One server might service several zones or different areas or there might be several servers in one zone.

The applications on the servers may be remotely executable on the servers and locally accessible by the handset. For example, the selected user applications might be WebOS-based applications that are already resident on the server.

Examples for the network server environment include, but are not limited to, one or more network types including Internet or intranet networks, local area networks (LAN), wireless LAN (WLAN) islands, i.e. hotspots, or WLAN in vehicles, i.e. moving or transit networks, meshed networks, Worldwide Interoperability for Microwave Access (WiMAX) networks, mobile access networks (MAN), and universal terrestrial radio access networks (UTRAN). A typical network sever environment would provide the requisite or desired security services.

Figure 4A:
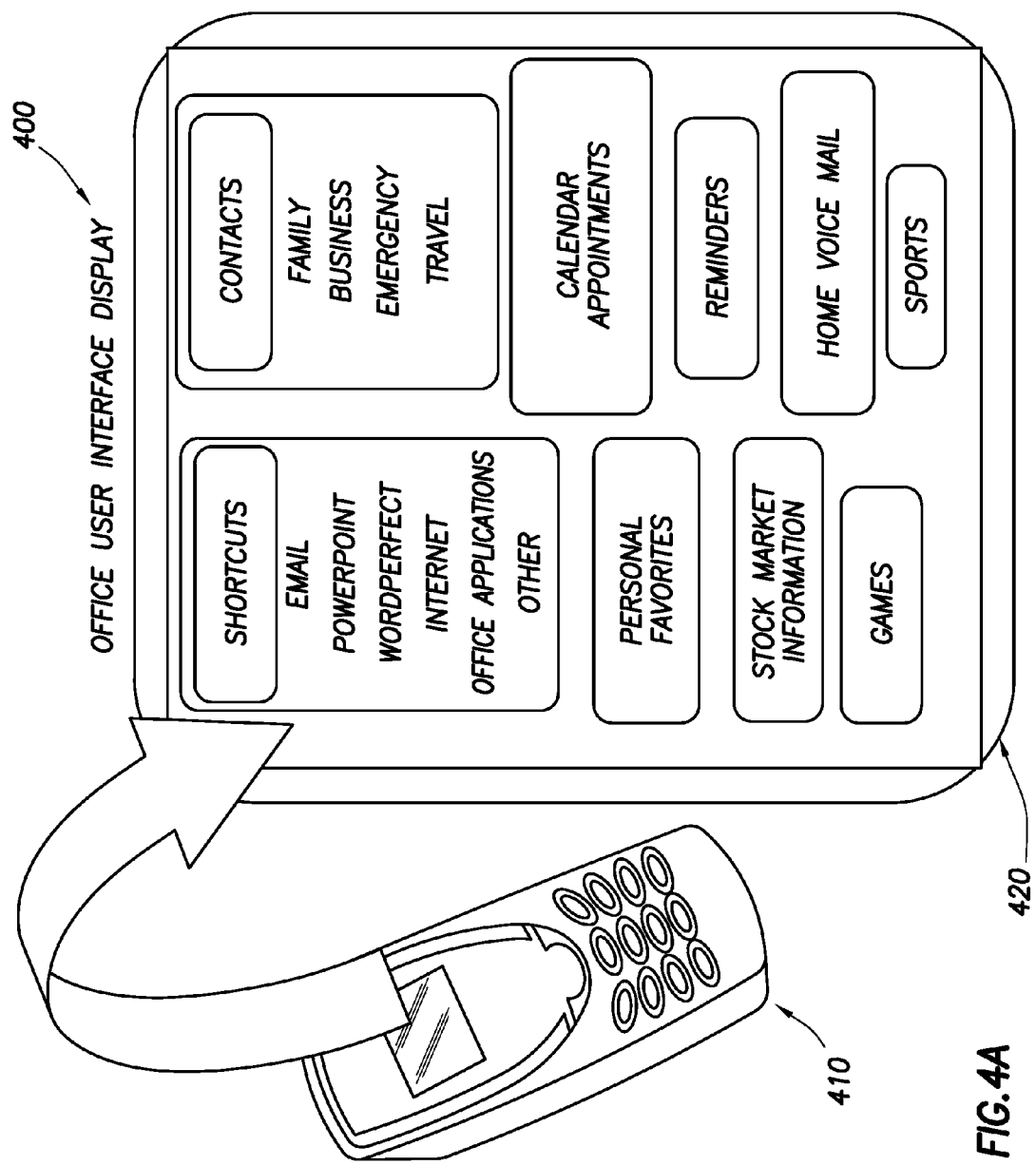
FIGS. 4A, 4B, and 4C are exemplary graphical user interfaces in accordance with various embodiments of the disclosure.

In FIG. 4A, diagram 400 illustrates an exemplary office user interface display. Handset 410 is illustrated as having a UI 420 display configured for the office zone 320. A UI 420 display for the office zone 320 may include shortcuts to Office Suite of business application, family contacts, emergency contacts, personal favorites such as stock, sports, games, among other applications. It should also be understood that the applications are not necessarily executable programs but may be non-executable data that is retained on the handset 410 as the handset 410 transitions between zones.

As the user transitions from the office zone 320 to the commute zone 340, the handoff agent determines whether the user has completed all processing relevant to the office zone 320. When the potential transition would not disrupt the user, the UI is updated relative to the commute zone 340.

Figure 4B:
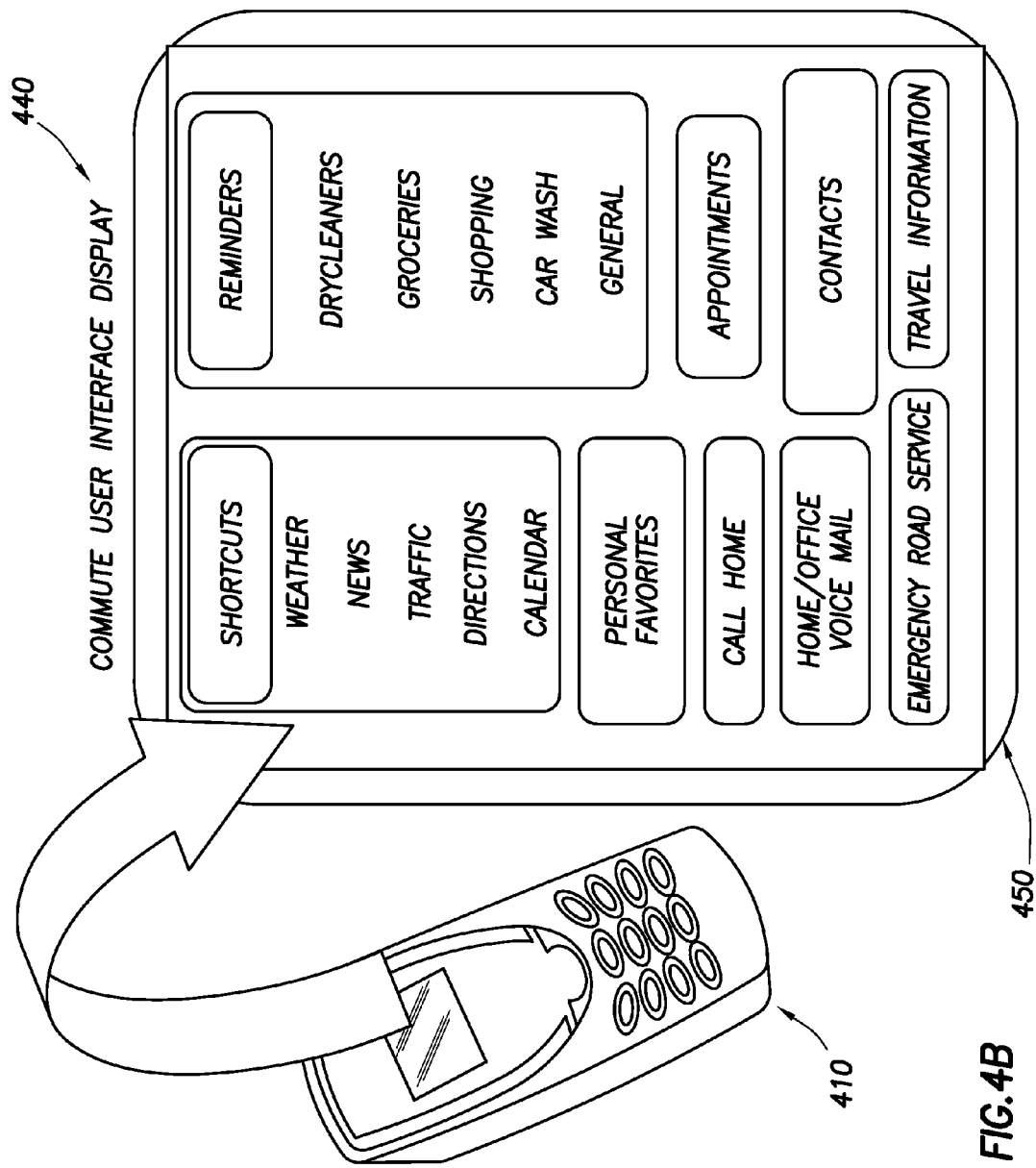

In FIG. 4B, diagram 440 illustrates an exemplary commute user interface display. Handset 410 is illustrated as having a UI 450 display configured for the commute zone 340. A UI 450 display for the commute zone 340 may include applications for maps, weather, traffic, automatic location directions, visual or audio options, family contacts, dinner favorites, such as take-out, delivery, recipes, etc., office intranet, key office contacts, family contacts, emergency contacts, family schedule, among other applications that a user or one of ordinary skill in the art would consider pertinent for the commute zone 340.

Figure 4C:
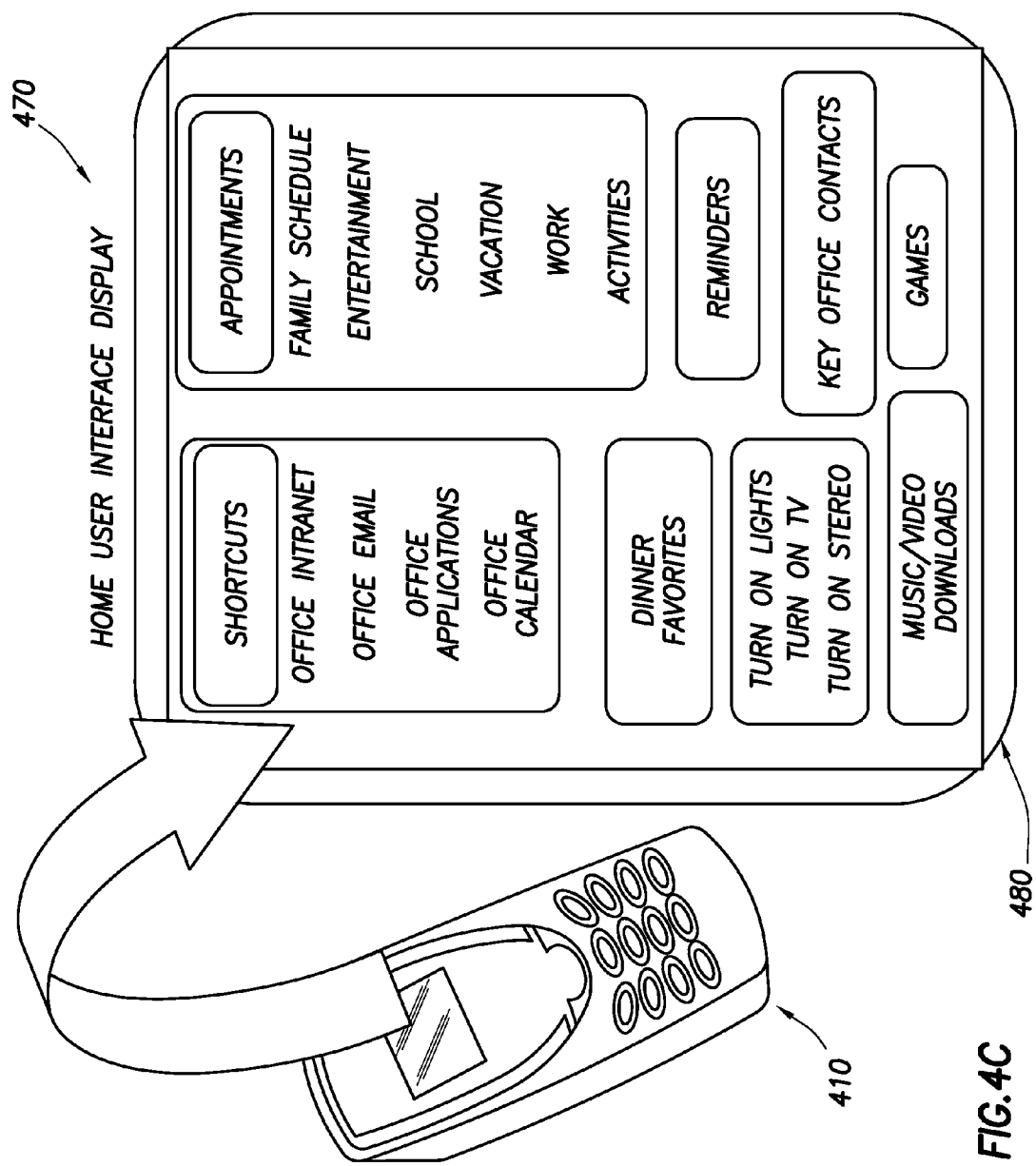

Similarly, when the handset is determined to be within the home zone 350, the appropriate UI may be displayed. In FIG. 4C, diagram 470 illustrates an exemplary home user interface display. Handset 410 is illustrated as having a UI 480 display configured for the home zone 350. A UI 480 display for the home zone 350 may include personal contacts, reminders, games, home theater, and may include others that a user or one of ordinary skill would consider pertinent for the home zone 350.

Figure 5:
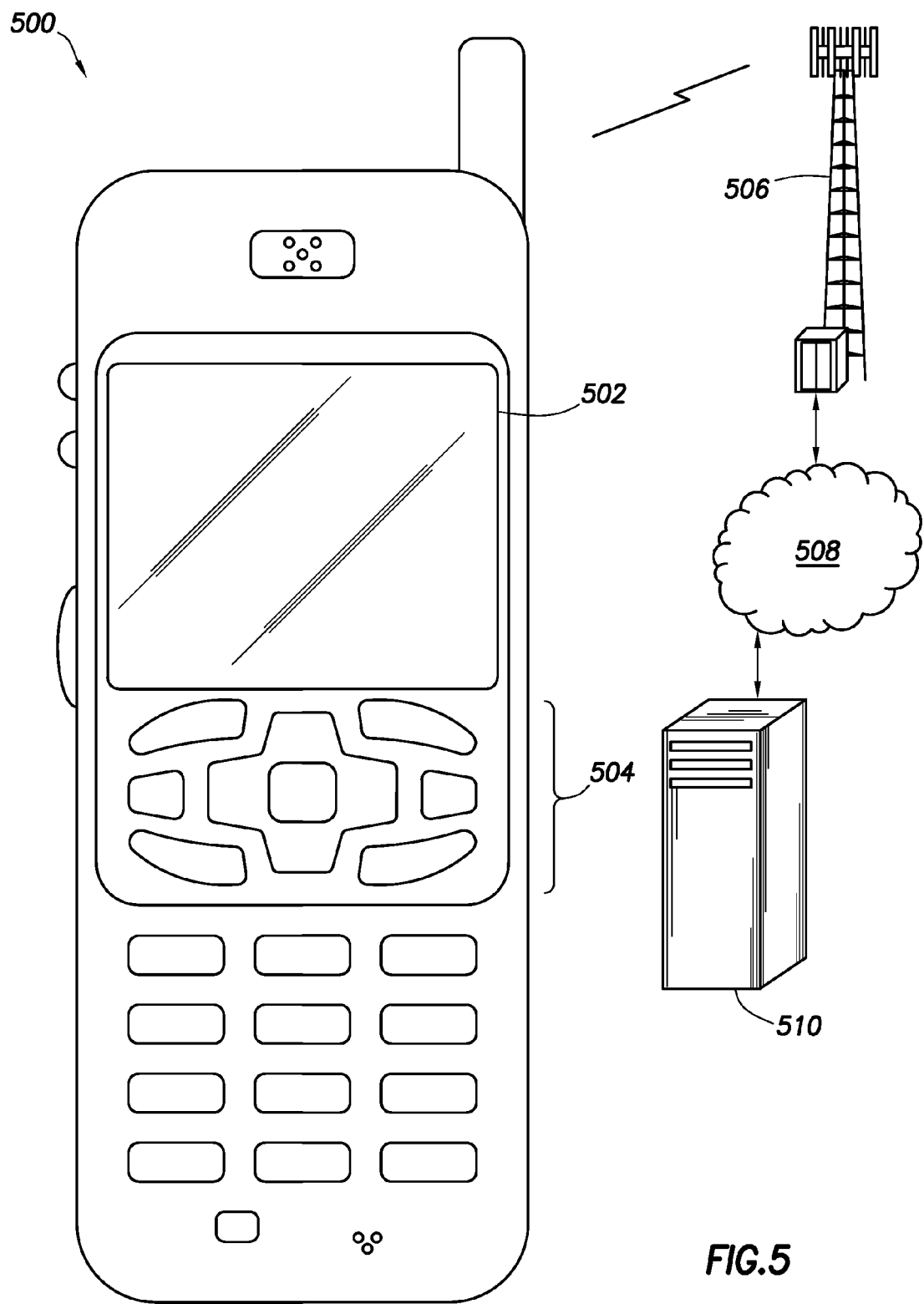
FIG. 5 is a diagram of a wireless communications system including a handset operable for some of the various embodiments of the disclosure.

FIG. 5 shows a wireless communications system including a handset 500. The handset 500 is operable for implementing aspects of the disclosure, such as displaying the user interface display applications, but the disclosure should not be limited to these implementations. Though illustrated as a mobile phone, the handset 500 may take various forms including a wireless handset, a pager, a personal digital assistant (PDA), a portable computer, a tablet computer, or a laptop computer. Many suitable handsets combine some or all of these functions. In some embodiments of the disclosure, the handset 500 is not a general purpose computing device like a portable, laptop or tablet computer, but rather is a special-purpose communications device such as a mobile phone, wireless handset, pager, or PDA.

The handset 500 includes a user interface display 502 and a touch-sensitive surface or keys 504 for input by a user. The handset 500 may present options for the user to select, controls for the user to actuate, and/or cursors or other indicators for the user to direct. The handset 500 may further accept data entry from the user, including numbers to dial or various parameter values for configuring the operation of the handset 500. The handset 500 may further execute one or more software or firmware applications in response to user commands and/or user configuration. These applications may configure the handset 500 to perform various customized functions in response to user interaction.

Through the use of various technologies such as WebOS, AJAX, DHTML or other browser customization technologies, the handset may obtain, execute and output the display of various web applications on the handset 500. Among the various applications executable by the handset 500 are a web browser, which enables the user interface display 502 to show a web page. The web page is obtained via wireless communications with a cell tower 506, a wireless network access node, or any other wireless communication network or system. The cell tower 506 (or wireless network access node) is coupled to a wired network 508, such as the Internet. Via the wired network 508, the handset 500 has access to information on various servers, such as a server 510. The server 510 may provide content that may be shown on the user display 502. The applications executed by the handset will reside on the server 510 or on a hierarchy of servers on the wired network 508. The wired network 508 may be a local area network at the office, residential network at home or other such localized network. The wired network 508 may also be a hierarchy of one or more networks.

Figure 6:
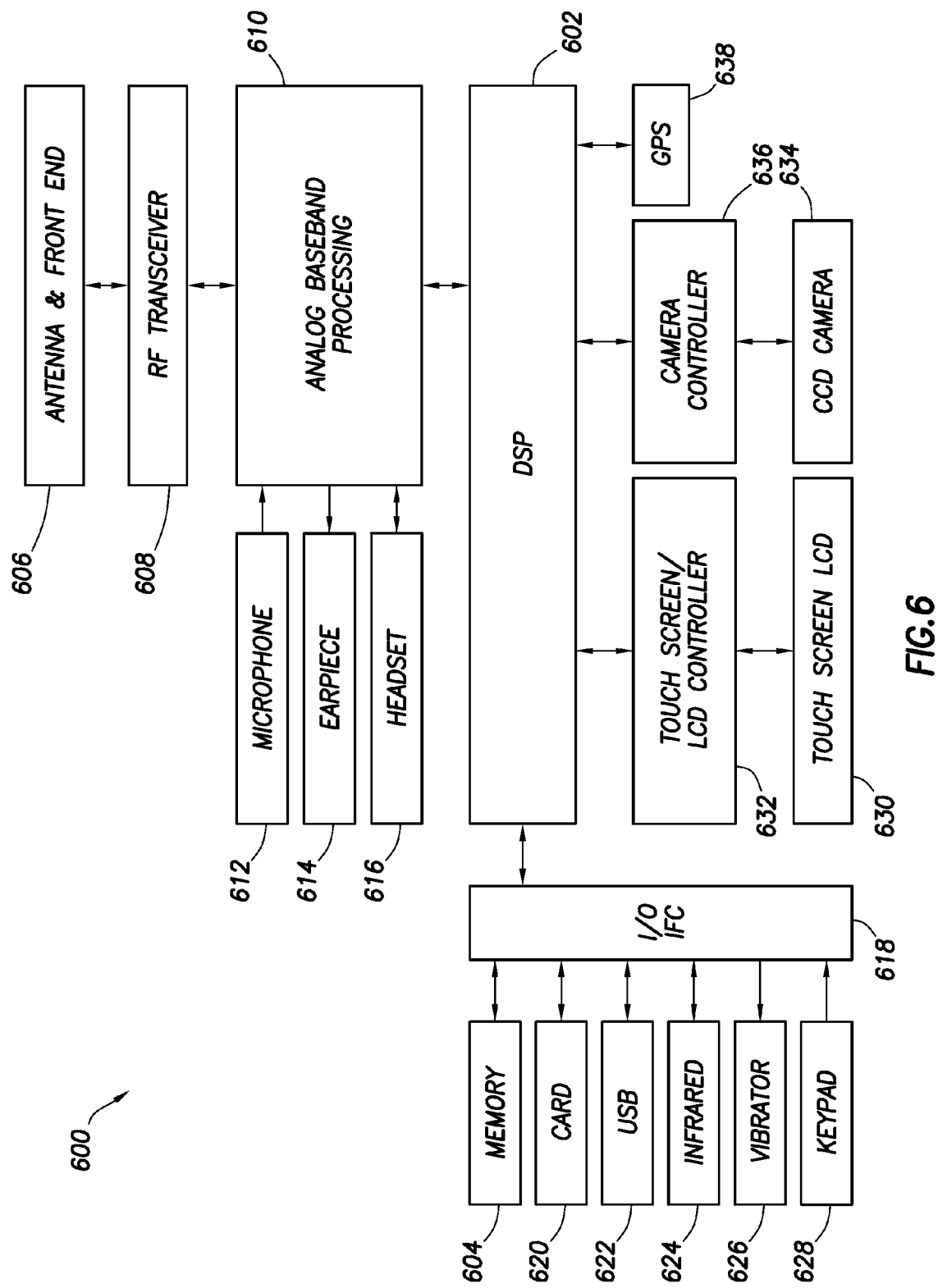
FIG. 6 is a detailed view of the internal circuitry of the handset depicted in FIG. 5.

FIG. 6 shows a block diagram of the handset 600. The handset 600 includes a digital signal processor (DSP) 602 and a memory 604. As shown, the handset 600 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638.

The DSP 602 or some other form of controller or central processing unit operates to control the various components of the handset 600 in accordance with embedded software or firmware stored in memory 604. In addition to the embedded software or firmware, the DSP 602 may execute other applications stored in the memory 604 or made available via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the handset 600 to send and receive information from a cellular network or some other available wireless communications network. The RF transceiver 608 provides frequency shifting, converting received RF signals to baseband and converting baseband transmit signals to RF. The analog baseband processing unit 610 may provide channel equalization and signal demodulation to extract information from received signals, may modulate information to create transmit signals, and may provide analog filtering for audio signals. To that end, the analog baseband processing unit 610 may have ports for connecting to the built-in microphone 612 and the earpiece speaker 614 that enable the handset 600 to be used as a cell phone. The analog baseband processing unit 610 may further include a port for connecting to a headset or other hands-free microphone and speaker configuration.

The DSP 602 may send and receive digital communications with a wireless network via the analog baseband processing unit 610. In some embodiments, these digital communications may provide Internet connectivity, enabling a user to gain access to content on the Internet and to send and receive e-mail or text messages. The input/output interface 618 interconnects the DSP 602 and various memories and interfaces 602. The memory 604 and the removable memory card 620 may provide software and data to configure the operation of the DSP 602. Among the interfaces may be the USB interface 622 and the infrared port 624. The USB interface 622 may enable the handset 600 to function as a peripheral device to exchange information with a personal computer or other computer system. The infrared port 624 and other optional ports such as a Bluetooth interface or an IEEE 802.11 compliant wireless interface may enable the handset 600 to communicate wirelessly with other nearby handsets and/or wireless base stations.

The input/output interface 618 may further connect the DSP 602 to the vibrator 626 that, when triggered, causes the handset 600 to vibrate. The vibrator 626 may serve as a mechanism for silently alerting the user to any of various events such as an incoming call, a new text message, and an appointment reminder.

The keypad 628 couples to the DSP 602 via the interface 618 to provide one mechanism for the user to make selections, enter information, and otherwise provide input to the handset 600. Another input mechanism may be the touch screen LCD 630, which may also display text and/or graphics to the user. The touch screen LCD controller 632 couples the DSP 602 to the touch screen LCD 630.

The CCD camera 634 enables the handset 600 to take digital pictures. The DSP 602 communicates with the CCD camera 634 via the camera controller 636. The GPS sensor 638 is coupled to the DSP 602 to decode global positioning system signals, thereby enabling the handset 600 to determine its position. Various other peripherals also may be included to provide additional functions, e.g., radio and television reception.

Figure 7:
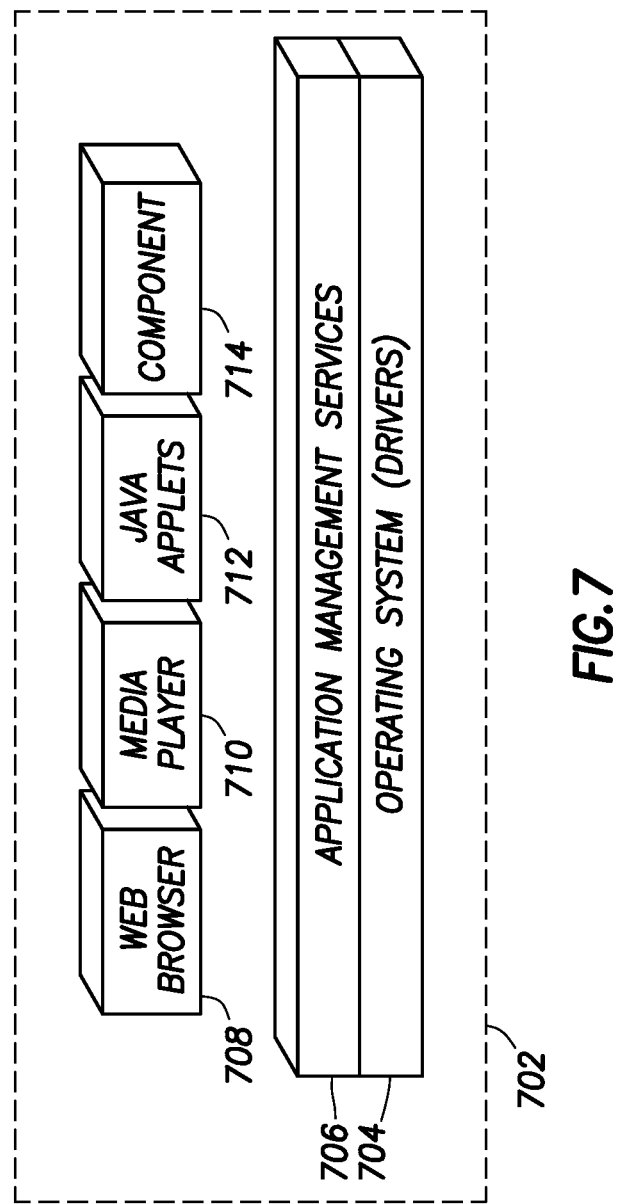
FIG. 7 is a diagram of a software environment that may be implemented on a handset operable for some of the various embodiments of the disclosure.

FIG. 7 illustrates a software environment 702 that may be implemented by the DSP 602. The DSP 602 executes operating system drivers 704 that provide a platform from which the rest of the software operates. The operating system drivers 704 provide drivers for the handset hardware with standardized interfaces that are accessible to application software. The operating system drivers 604 include application management services ("AMS") 706 that transfer control between applications running on the handset 600. The AMS includes the handoff agent. Also shown in FIG. 7 are a web browser application 708, a media player application 710, and Java applets 712. The web browser application 708 configures the handset 700 to operate as a web browser, allowing a user to enter information into forms and select links to retrieve and view web pages. The media player application 710 configures the handset 700 to retrieve and play audio or audiovisual media. The Java applets 712 configure the handset 700 to provide games, utilities, and other functionality. A component 714 may be resident on the handset, servers, or both and may be operable to promote implementation of the present disclosure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascer-

What is claimed is:

1. A method for providing a zone-based user interface (UI) on a mobile device, comprising:
   defining usage zones;
   associating at least one user interface with each one of the defined usage zones;
   responsive to identifying the mobile device is within a defined zone of the defined usage zones, determining whether a user is actively using the mobile device;
   responsive to identifying the mobile device is within the defined zone and determining that the user is not actively using the mobile device, automatically displaying the user interface associated with the defined zone;
   responsive to identifying the mobile device is within the defined zone and determining that the user is actively using the mobile device, preventing display of the user interface associated with the defined zone, and at least one of:
      manually selecting a location of at least one usage zone associated with a UI by entering at least one of map coordinates, a radius, a starting point, or an ending point; and
      geographically traversing an area within the at least one usage zone, wherein the mobile device determines the boundary of the usage zone.

2. The method of claim 1, further comprising:
   automatically determining a location of at least one zone by utilizing a sensing technique selected from the group consisting of triangulation, global positioning system (GPS), and satellite radar.

3. The method of claim 2, wherein the UIs include access to applications, the applications are remotely executable and locally accessible.

4. The method of claim 1, wherein the at least one user interface is further defined as first and second user interfaces that provide access to different applications, and the first and second user interfaces are different interfaces selected from a group comprising a home user interface, an office user interface, or a commute user interface.

5. The method of claim 1, wherein zones further comprises selecting a default UI that is activated when the mobile device is not within any of the defined usage zones.

6. The method of claim 1, further comprising:
   manually selecting a location of at least one usage zone associated with a UI by entering at least one of map coordinates, a radius, a starting and an ending point; and
   activating the at least one usage zone by defining a starting and ending time period for which the at least one usage zone is valid, wherein the at least one usage zone includes a time aspect such that when the mobile device enters the usage zone, the time aspect determines whether the usage zone is active.

7. A mobile device comprising:
   a display;
   a processor; and
   a memory configured to store data of a first user interface related to a first geographic area and a second user interface related to a second geographic area,
   wherein the processor is configured to provide the first user interface to the display when the mobile device is in the first geographic area, to automatically provide the second user interface to the display in response to identifying that the mobile device moved to the second geographic area, to determine whether a user is actively using the mobile device, to prevent a transition from the first user interface to the second user interface in response to determining that the user is actively using the mobile device, and to promote a transition from the first user interface to the second user interface in response to identifying that the mobile device moves from the first geographic area to the second geographic area and determining that the user is not actively using the mobile device, and
   wherein the user applications are remotely executable and locally accessible.

8. The mobile device of claim 7, wherein the first and second user interfaces are different interfaces selected from a group comprising a home user interface, an office user interface, or a commute user interface.

9. The mobile device of claim 7, wherein determining whether a user is actively using the mobile device comprises determining whether the user is online or accessing an application.

10. The mobile device of claim 7, wherein the first and second user interfaces enable access to applications and features of the mobile device, the applications and features related to the respective geographical areas.

11. The mobile device of claim 10, wherein the memory is configured to store data of a third user interface related to a third geographic area and wherein the first, second, and third geographic areas are different areas selected from a group comprising a home geographic area, an office geographic area, or a commute geographic area.

12. The mobile device of claim 10, wherein the user applications are WebOS applications.

13. A system for adaptive user interface for a mobile device, comprising:
   a storage device configured to store instructions that when processed by a processor promote:
      defining usage zones,
      associating at least one user interface (UI) with each one of the defined usage zones,
      activating an override UI display flag if a user is actively using the mobile device;
      responsive to identifying the mobile device is within a defined zone of the defined usage zones and the override UI display flag is not active, automatically displaying the user interface associated with the defined zone; and
      responsive to determining the mobile device is within the defined zone and that the override UI display flag is active, preventing the display of the user interface associated with the defined zone; and
   a handoff agent, such that when the mobile device is locally accessing an application executing on a first server servicing a first service area and the mobile device moves from the first to a second service area serviced by a second network server, the handoff agent is configured to promote a handoff of execution of the application from the first server to the second server to prevent disrupting the mobile device's use of the application.

14. The system of claim 13, further comprising a telecommunications network, comprising:
   a first network server servicing a first service area;
   a second network server servicing a second service area;
   a processor on the mobile device configured to execute the instructions to promote display of the at least one user interface on a display of the mobile device when the mobile device is within one of the defined usage zones.

15. The telecommunications network of claim 14, wherein the at least one user interface is further defined as a first and second user interfaces that provide access to different applications, the different applications executable on one or more of the plurality of network servers.

16. The telecommunications network of claim 15, wherein the first and second user interfaces are selected from a group consisting of a home user interface, an office user interface, and a commute user interface.

17. The telecommunications network of claim 16, wherein the defined usage zones include defined geographic areas comprising a home zone and an office zone.

18. The telecommunications network of claim 17, further comprising a third geographic zone defined as a commute zone.

19. The telecommunications network of claim 17, wherein the home zone comprises one of the different applications selected from a group consisting of home theater, office intranet, key office contacts, reminders and family schedule and the office zone comprises one of the different applications selected from the group consisting of email, office suite, family contacts, and emergency contacts.

20. The telecommunications network of claim 18, wherein the commute zone comprises one of the different applications selected from a group consisting of maps, weather, traffic, family schedule, family contacts, emergency contacts, and office intranet.

\* \* \* \* \*